United States Patent
Lamar et al.

(10) Patent No.: US 6,262,496 B1
(45) Date of Patent: *Jul. 17, 2001

(54) COMBINATION ELECTRICAL MULTI-STRIP RECEPTACLE WITH TIMER AND ENCLOSURE

(75) Inventors: Donald F. Lamar, Fort Wayne, IN (US); Spencer L. Mackay, Agoura Hills; James J Hornsby, Camarillo, both of CA (US)

(73) Assignee: Hubbell Incorporated, Orange, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,418

(22) Filed: May 14, 1998

Related U.S. Application Data

(60) Provisional application No. 60/046,449, filed on May 14, 1997.

(51) Int. Cl.[7] ................................................. H01R 13/66
(52) U.S. Cl. ........................................... 307/117; 307/140
(58) Field of Search ..................................... 307/112, 116, 307/117, 125, 139, 140, 141, 141.4, 141.8; 315/157, 158, 159, 307, 151

(56) References Cited

U.S. PATENT DOCUMENTS

| | | | |
|---|---|---|---|
| 4,546,418 | 10/1985 | Baggio et al. | 362/85 |
| 5,196,988 | 3/1993 | Horn | 361/362 |
| 5,272,418 * | 12/1993 | Howe et al. | 315/159 |
| 5,274,527 * | 12/1993 | Retzlaff | 361/118 |
| 5,442,177 * | 8/1995 | Boulos et al. | 250/342 |
| 5,488,208 * | 1/1996 | Seewald | 200/43.22 |
| 5,498,931 * | 3/1996 | Bedocs | 315/158 |
| 5,586,048 * | 12/1996 | Coveley | 364/492 |
| 5,592,033 * | 1/1997 | Gold | 307/117 |
| 5,605,466 * | 2/1997 | Devlin et al. | 439/144 |
| 5,789,868 * | 8/1998 | Sears | 315/149 |
| 5,831,391 * | 11/1998 | MacKay | 315/159 |

FOREIGN PATENT DOCUMENTS 2232533   12/1990   (GB) .

OTHER PUBLICATIONS

Undated Sales Brochure "Lamar Outdoor Outlets" provided by applicants.*

* cited by examiner

*Primary Examiner*—Fritz Fleming
(74) *Attorney, Agent, or Firm*—Roylance, Abrams, Berdo & Goodman LLP

(57) ABSTRACT

A combination enclosure and electrical apparatus includes an electronic control circuit which provides multiple modes of operation of electrically operated devices connected thereto. The electrical apparatus is connected to a power supply, such as a common residential alternating current power source, and includes receptacles for connecting the electrical apparatus to electrical devices to be controlled thereby. The control circuit is electrically disposed intermediate the power supply and the receptacles and controls the operation of connecting the power supply with the receptacles for powering the connected electrical devices. A rotary switch permits a user to select from multiple preselected modes of operation, which are stored or effected by the control circuit, to effect the desired operation of the connected electrical devices.

30 Claims, 9 Drawing Sheets

COMBINATION ELECTRICAL MULTI-STRIP RECEPTACLE WITH TIMER AND ENCLOSURE

CROSS REFERENCE TO RELATED APPLICATIONS

This application claims the benefit under Title 35, U.S.C. §119(e) of U.S. Provisional patent application Ser. No. 60/046,449, entitled ELECTRICAL MULTI-STRIP RECEPTACLE WITH TIMER AND RAIN TIGHT ENCLOSURE, filed on May 14, 1997.

BACKGROUND OF THE INVENTION

The present invention relates to electrical devices in general and in particular to electrical devices for use in areas exposed to the elements, such as rain. Often power is supplied to receptacles at outdoor locations, such as for outdoor lawn and garden equipment, lighting, recreation, etc., and is controlled in an on/off manner from inside a residence or other building. It is often desirable for a user to have greater and more versatile control over the operation of electrically operated devices connected to an outdoor power supply.

Often use of electricity outdoors gives rise to safety concerns for individuals and to concerns of damage to equipment. Many prior art devices are merely enclosures for being secured to separate receptacle boxes and providing shielded access to a separate receptacle, and offer no enhanced control over the operation of the receptacle or devices connected thereto.

SUMMARY OF THE INVENTION

The present invention provides an electrical device for use in areas exposed to the elements, which includes a weatherproof enclosure for housing the electrical components of the device and for shielding such components from the elements. The present invention utilizes enhanced operational control to permit a user to easily choose between a variety of operational settings for selecting a desired predetermined automatic mode of operation for electrically operated devices connected to the device of the invention.

The enclosure of the present invention is designed in such a way to prevent water from sprinklers or rain, or other liquids or debris from getting inside the cavity surrounding the electrical devices. The top and bottom housings have a deep safety lap joint to help seal the joint. A step at the bottom of the female (bottom) portion is provided to stop and seal the male (top) housing, further, a small bead is provided on the step to trap the male lap rim. Openings in the housing for mounting screw are sealed by tubular walls with caps, bonded in place inside to prevent water from entering the housing. Similar openings are provided for an optional support stake and are sealed internally with rectangular plates.

As little or no moisture should enter the cover, no particular seal is necessary for the timer/control selection knob or circuit breaker openings in the front face of the housing. The only remaining opening in the housing is for the electrical cord and faces downward for draining purposes. The at least partially transparent cover is attached via a hinge joint comprising tubular pins on the housing (lower) and corresponding holes in the cover. A step interface between the cover and the housing helps seal the joint from water which may seek to run down and along the joint rather than to cross it and enter the enclosure cavity. The top housing edge has a transverse blade which seals against the inside of the cover. A snap latch is provided at the bottom of the enclosure to maintain closure. The step design of the cover-to-housing joint should protect from all but a concentrated blast of water from the rear, which is normally positioned against a wall or other support.

In one embodiment, the present invention provides a combination electrical apparatus and enclosure. The electrical apparatus is connected to a power supply and includes at least one receptacle for receiving an electrical plug for connecting the power supply to an electrical device. An electronic control circuit is connected electrically intermediate the receptacle and the power supply and includes an input and an output. A photo-sensitive device is connected to the control circuit input and is adapted to generate a signal that generally indicates a threshold level of darkness. The control circuit is adapted to connect the receptacle to the power supply based upon the signal. The enclosure includes a base which supports and houses the control circuit, and a cover that is hingeably mounted to the base. The cover is pivotable between an open position and a closed position. The base includes a front face that supports the receptacle.

In a second embodiment of the present invention the enclosure base comprises front and rear faces, a top, a bottom, and side portions which define an interior space that is adapted to receive electrical components. The base front face supports at least one receptacle, and the base rear face is adapted to mount the enclosure to a support. Each of the base sides include a hinge projection. The enclosure cover comprises a front face, a top, a bottom and side portions. The cover bottom is adapted to receive at least one cord. The cover and base are adapted in combination to form a cavity for receiving electrical components. The cover top and side portions are configured to at least partially overlap the base top and side portions when attached thereto, whereby the electrical components contained within said cavity are substantially isolated from environmental conditions. Each of the cover side portions includes an opening for receiving the base hinge projection and a channel adjacent the cover opening to guide and facilitate positioning of the base projections into the cover openings when mounting the cover onto the base. The cover sides are made of a material that permits deflection of the cover sides to allow mounting of the cover onto the base, whereby the cover may be removed from the base when mounted to a support. Each combination of cover opening and base hinge projection is adapted to form a hinge, whereby the cover may be pivoted between open and closed positions.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
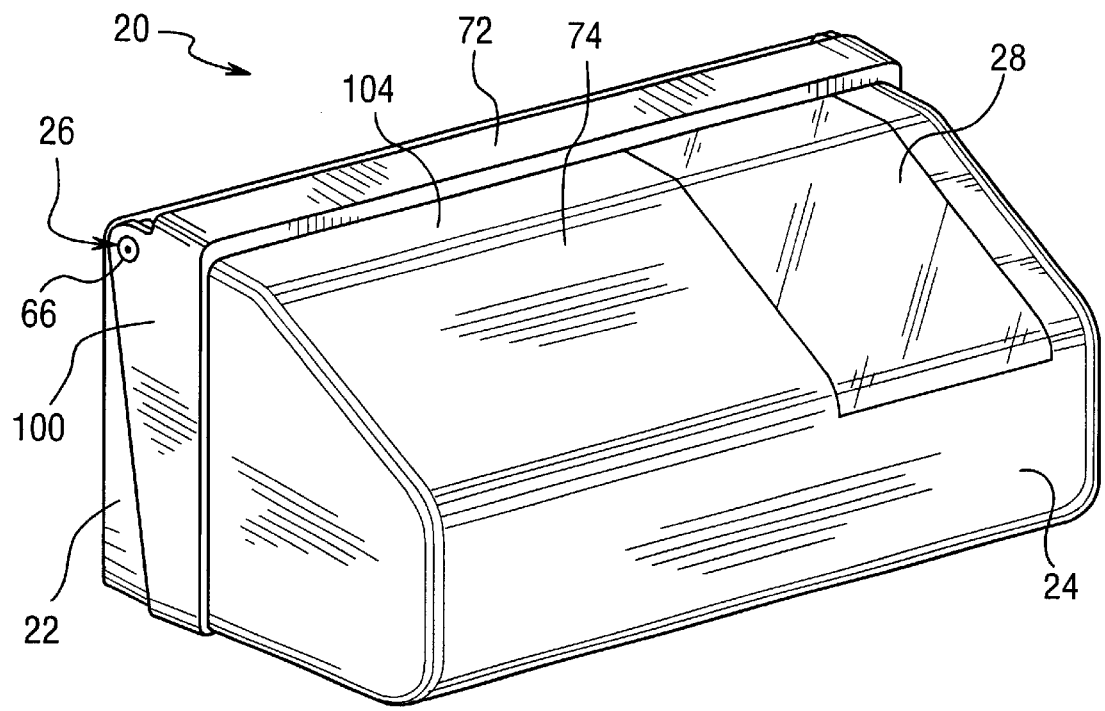
FIG. 1 is a left-front perspective view of the enclosure of the present invention.
Figure 2:
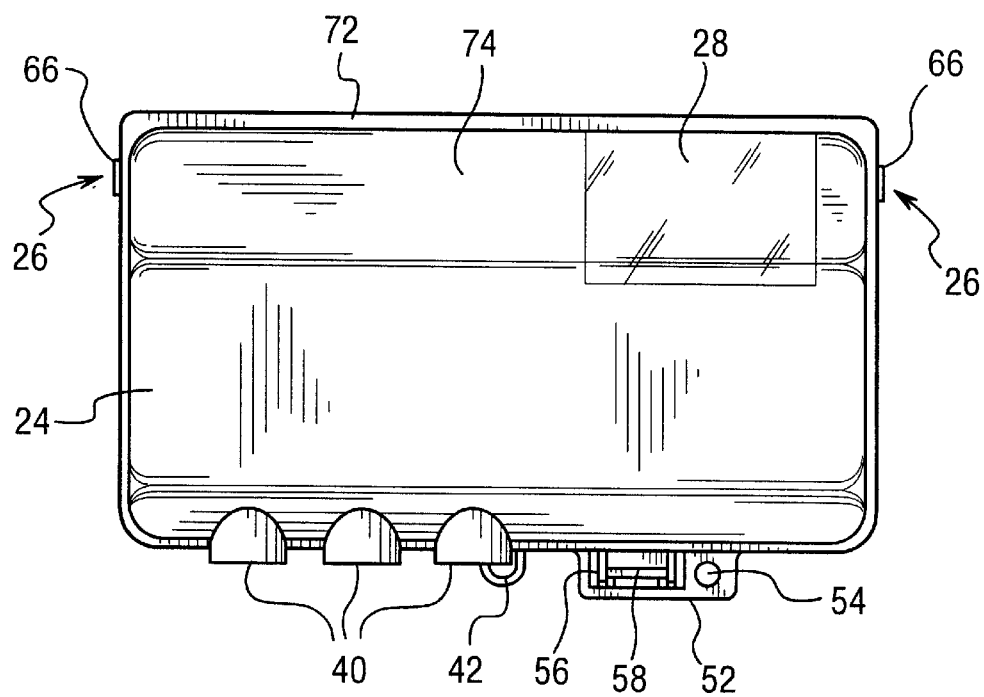
FIG. 2 is a front view of the enclosure of FIG. 1.
Figure 3:
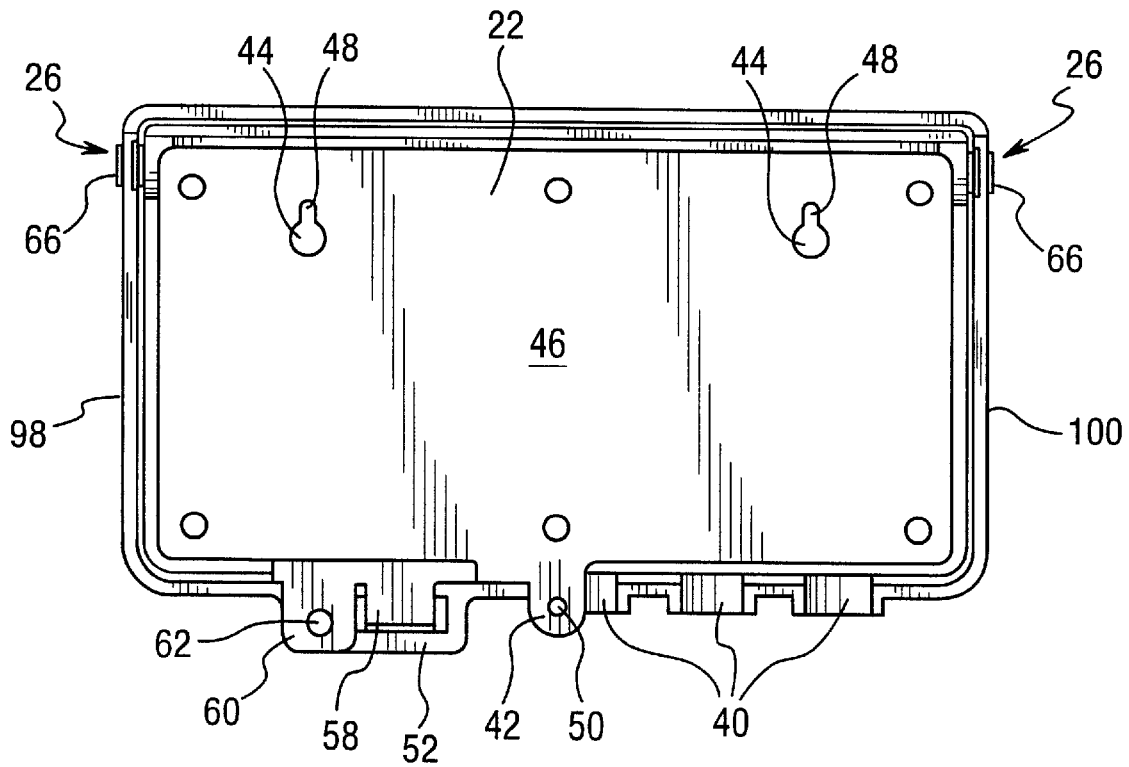
FIG. 3 is a rear view of the enclosure of FIG. 1.
Figure 4:
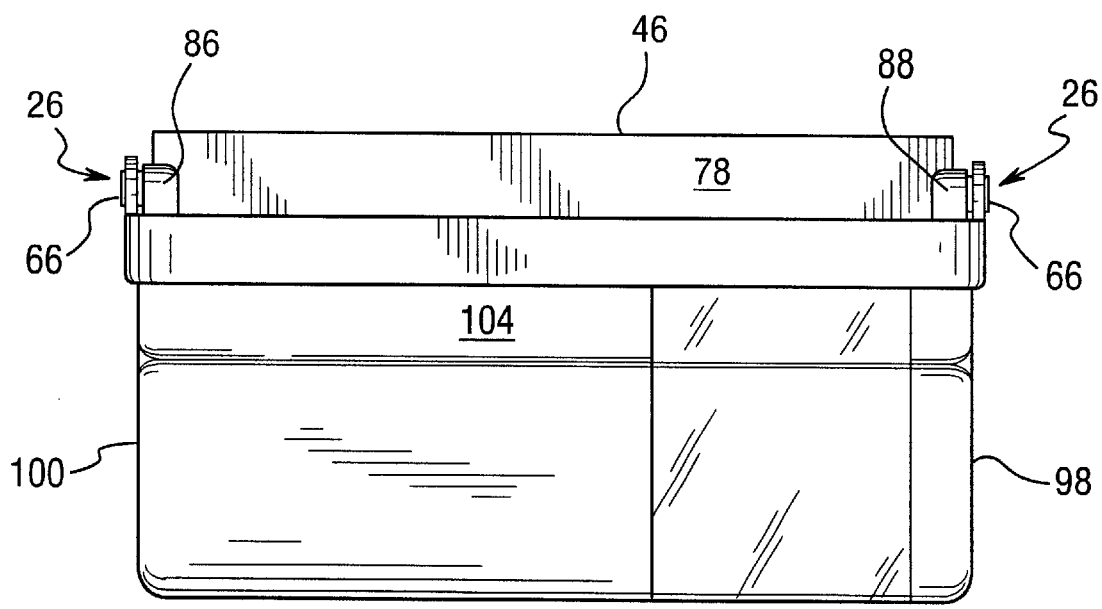
FIG. 4 is a top view of the enclosure of FIG. 1.
Figure 5:
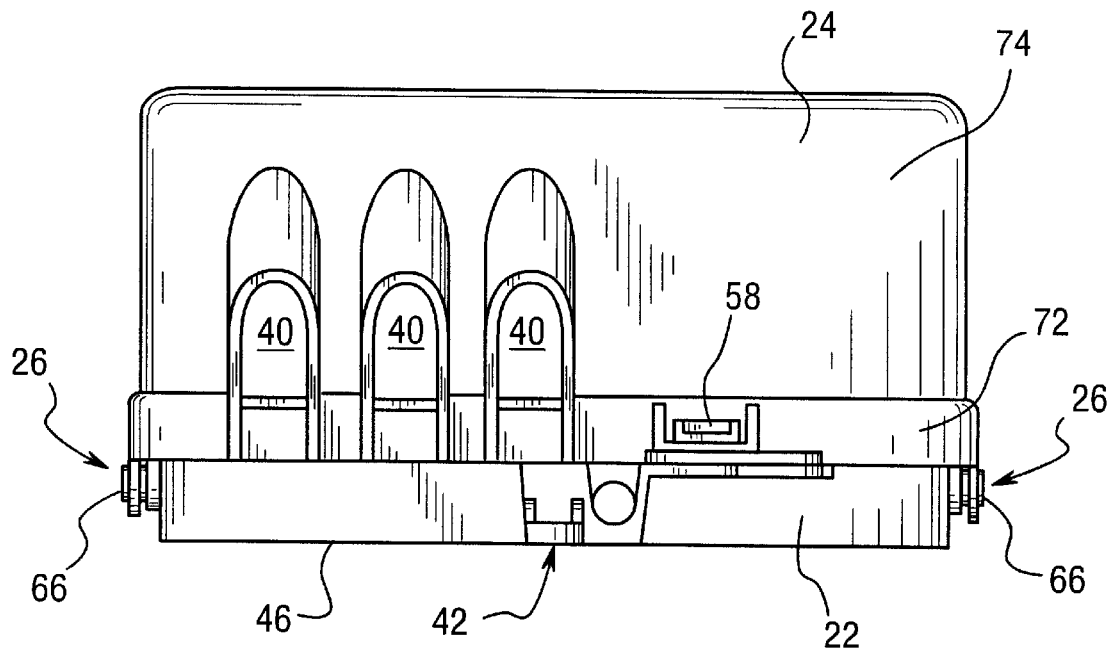
FIG. 5 is a bottom view of the enclosure of FIG. 1.
Figure 6:
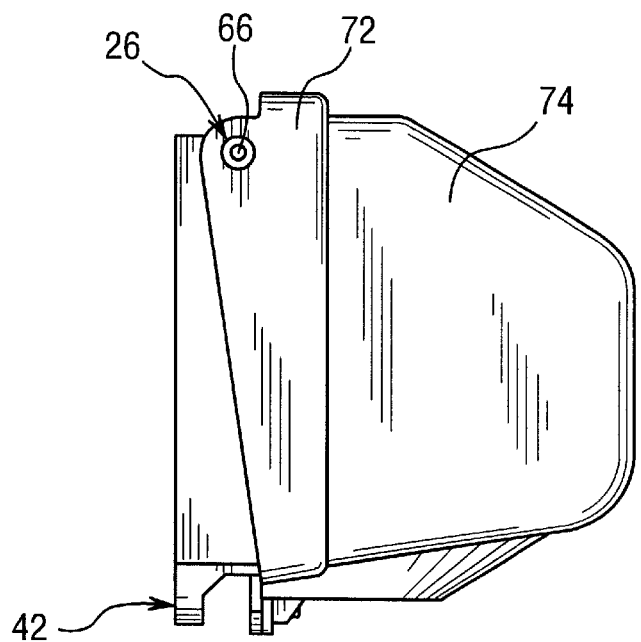
FIG. 6 is a left side view of the enclosure of FIG. 1.
Figure 7:
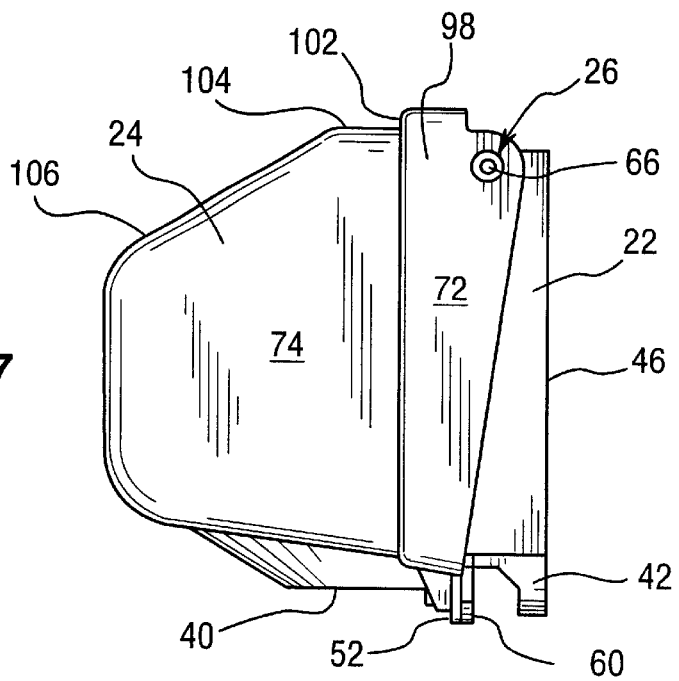
FIG. 7 is a right side of the enclosure of FIG. 1.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DETAILED DESCRIPTION OF THE INVENTION

Figure 8:
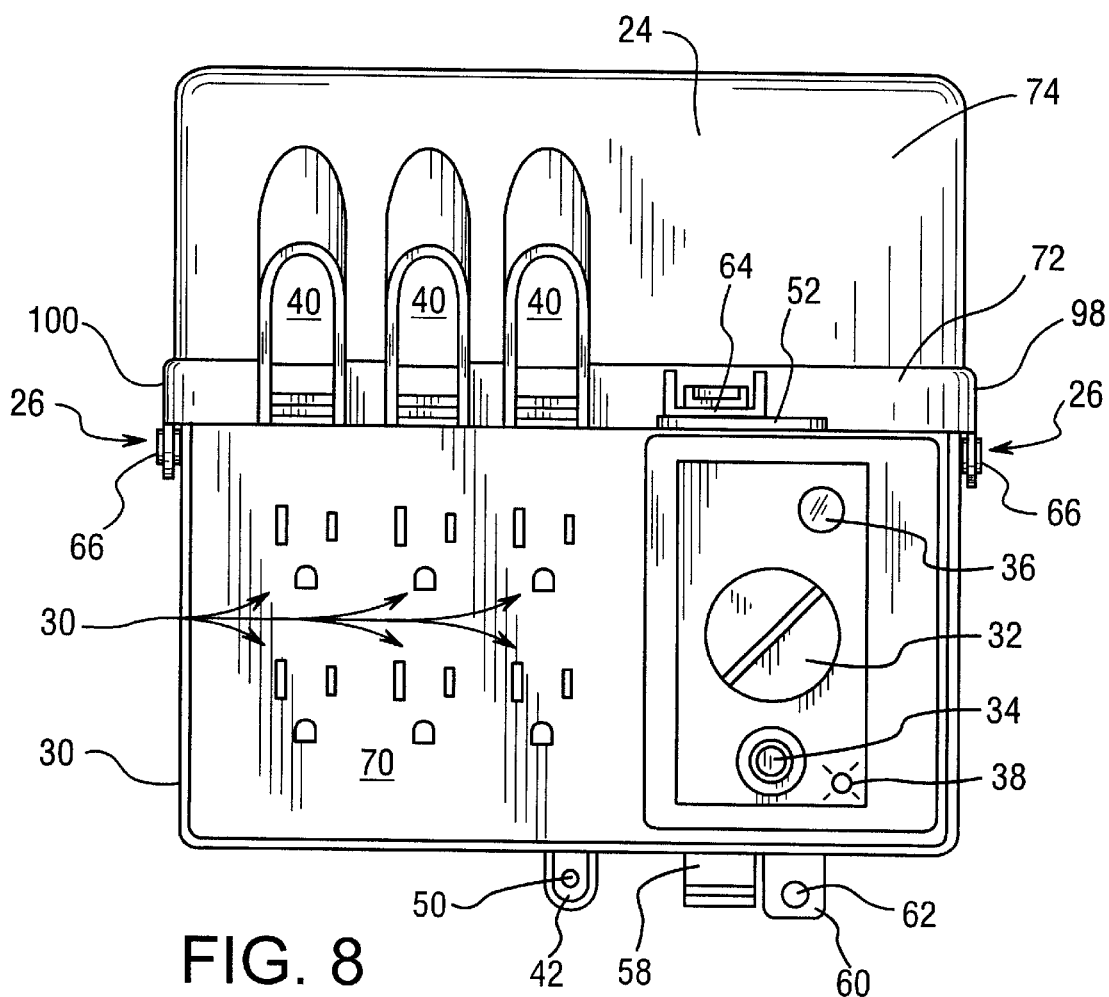
FIG. 8 is a front view of the enclosure of FIG. 1 showing the cover in an open position.
Figure 9:
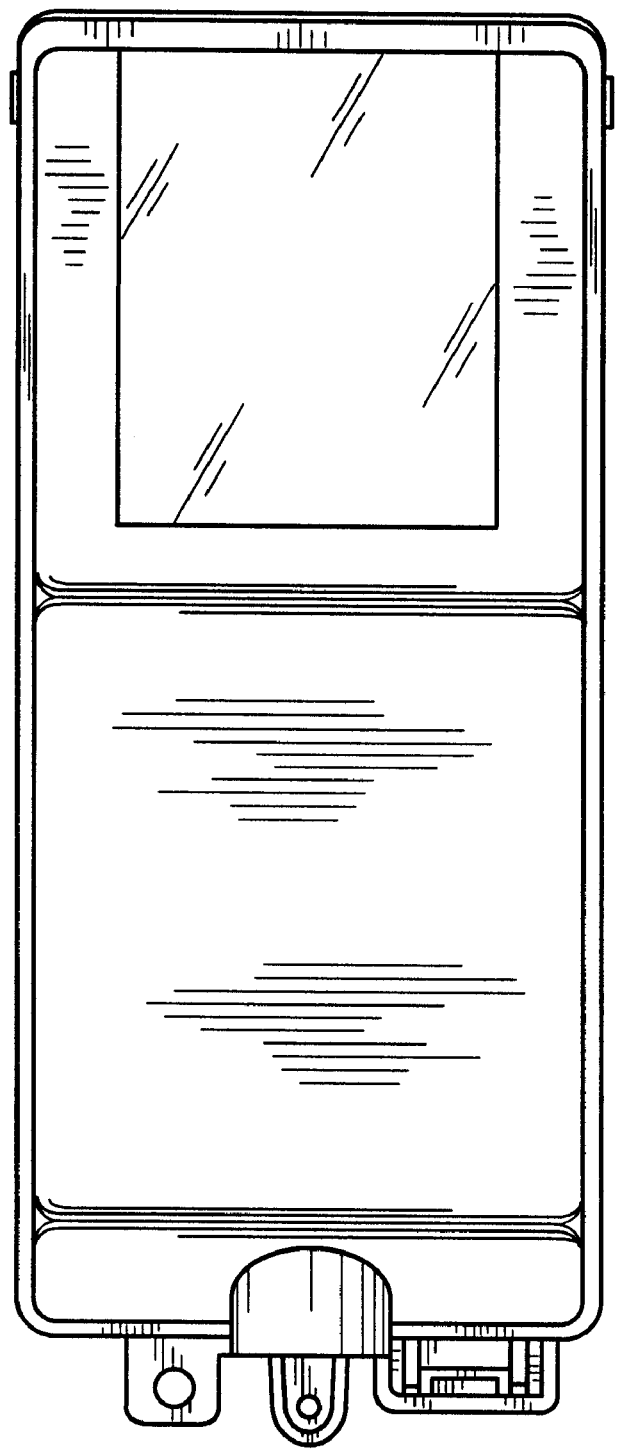
FIG. 9 is a front view of a second embodiment of the enclosure of the present invention.
Figure 10:
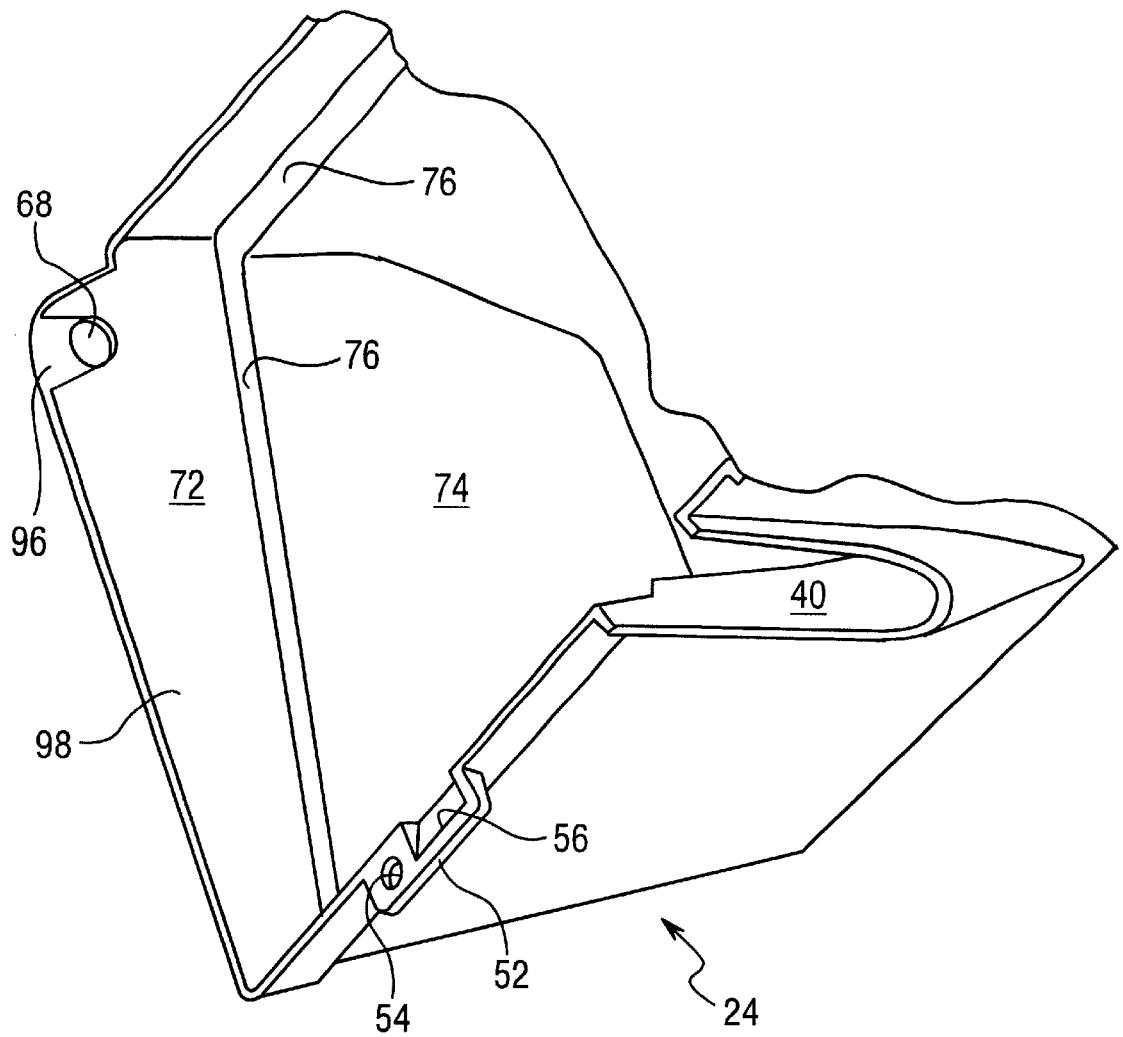
FIG. 10 is a cutaway perspective view showing the interior of the cover of the enclosure of FIG. 1.
Figure 11:
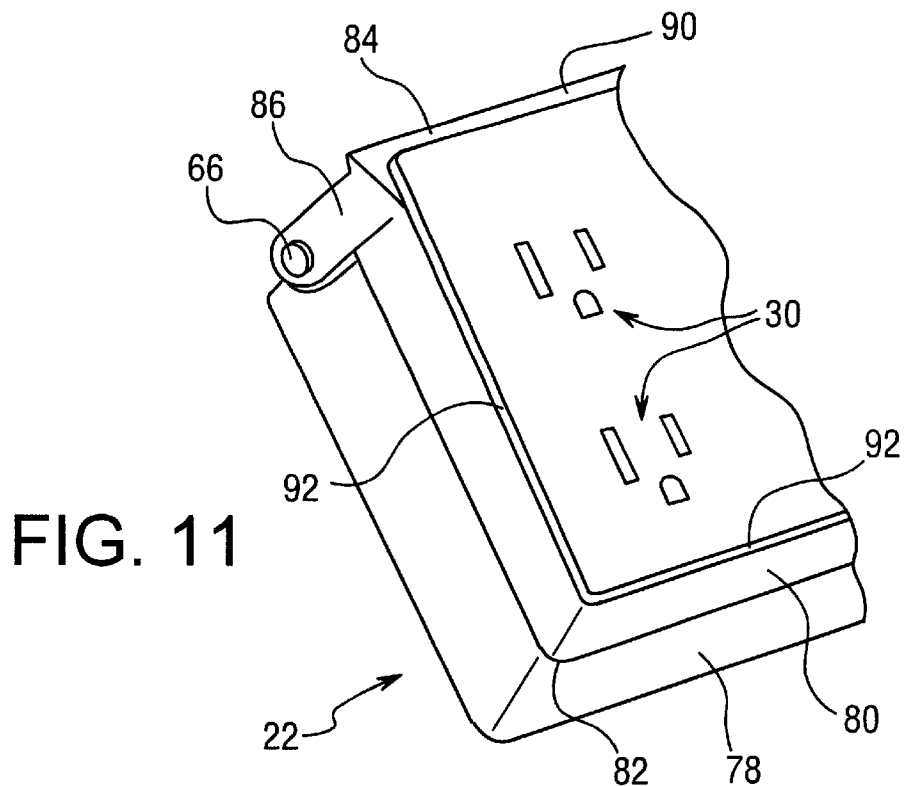
FIG. 11 is a cutaway frontal perspective view of the base portion of the enclosure of FIG. 1.
Figure 12:
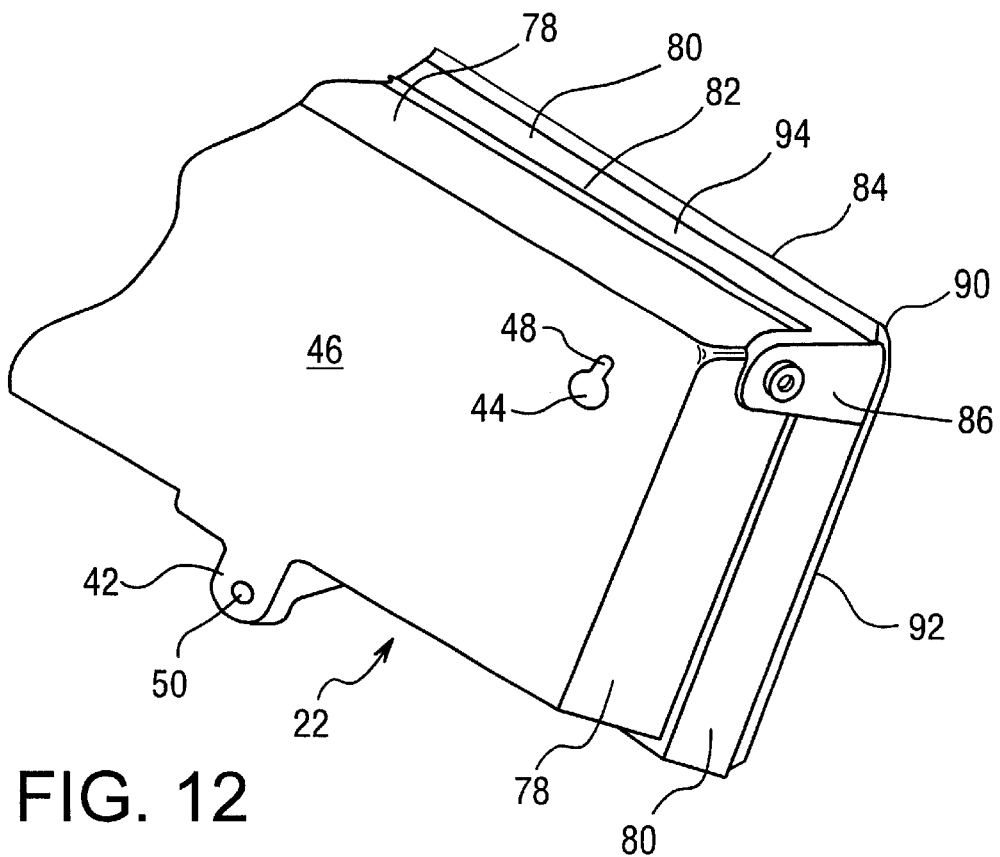
FIG. 12 is a cutaway rear perspective view of the base portion of the enclosure of FIG. 1.

Referring now to the drawings and particularly to FIG. 1, the present invention includes weatherproof enclosure 20 having base portion 22 and cover 24 hingeably connected to base 22, such as by hinges 26. Cover 24 may be transparent or opaque and, if opaque, may be provided with transparent window 28 to permit visual inspection of interior components housed within enclosure 20. Enclosure 20 is intended for use with electrical components, such as receptacles 30, rotary control switch 32, reset switch 34, light sensitive switch or sensor 36, indicator light 38, etc., such as shown in FIG. 8.

Openings or notches 40 are provided in cover 24 to receive and accommodate electrical cords with plugs inserted into receptacles 30 to supply power to electrically operated devices, such as outdoor lighting, flood lamps, lawn and garden equipment, including sprinkling or watering systems, televisions, stereo-equipment, etc. The operator must examine the electrical ratings of the electrical components to ensure that such electrically operated devices are proper for use with the device. In the embodiment shown in FIGS. 1 through 8, openings 40 are sized so as to receive and accommodate two electrical cords and are sloped so as to provide optimal cord accommodation. With a plug inserted into a receptacle, the cord generally loops outwardly toward the cover and then back inwardly toward the base and out the sloped opening 40.

Projection 42 extends from base portion 22 and is provided with screw receiving opening 50. Openings 44 are provided in back wall 46 of base portion 22 such that screw heads, once secured to a structure to which enclosure 20 is to be attached, are received therethrough and into base portion 22. Openings 44 include smaller opening portion 48 that is sized large enough to receive the stem portion of a screw or nail but small enough not to permit a nail or screw head to pass therethrough. Accordingly, enclosure 20 may be mounted flush to a structure, such as a wall, post, etc., by locating mounting screws or nails so that they are received in preferably a recess formed in backwall 46 with the heads of the nails or screws engaging the interior surface of the recess formed in backwall 46 to thereby support enclosure 20. A third screw or nail is then received through opening 50 such that the head of the nail or screw engages projection 42 about opening 50 so as to secure the lower portion of base portion 22 to the support structure.

Cover 24 is provided with lower projection 52 having pad lock receiving opening 54 and clasp receiving aperture 56. Base portion 22 is provided with clasp member 58 and a second projection 60 having pad lock receiving opening 62. With cover 24 in a closed position, lower projection 52 of cover 24 is flush against second projection 60 of base portion 22, with respective openings 54 and 62 aligned so as to receive a padlock member for locking cover 24 in a closed position. In the closed position, clasp member 58 is received in clasp receiving aperture 56. When transitioning cover 24 from an open position to a closed position, clasp member 58 is initially deflected by and eventually rests upon and engages shelf portion 64 of lower projection 52. To open cover 24 from a closed position, clasp member 58, made of resilient material, must be deflected upwards and moved backwards and over shelf portion 64 to become disengaged therefrom, thereby permitting the free hinged movement of cover 24 about hinges 26.

Hinges 26 include a hinge or pivot pin 66 which is received in pivot pin receiving openings 68 formed in opposite sides of cover 24. Although a particular hinge arrangement having a pair of pivot pins and openings are shown in the drawings and described herein, the particular means for providing a hinged or pivoting relationship between the cover and the base is not a critical component of the invention and any one of numerous known methods for accomplishing this function is fully comprehended by the present invention. Thinned pivot pin guides 96 are provided adjacent openings 68 to aid in mounting cover 24 onto base portion 22. Cover 24 is preferably made of a material, such as plastic, that is sufficiently resilient to permit deflection along sides 98 and 100 to receive pivot pins 66 into openings 68.

Cover 24 and base portion 22 are configured optimally to prevent rain, water, or other liquids from entering the enclosed area formed by the base and cover with the cover in the closed position. In this manner, the electrical devices in front wall 70 of the base portion are protected from damage and the possibility of electrical shock caused by wet conditions is minimized. Cover 24 includes first portion 72 having a first circumference and second inset portion 74 having a second circumference of lesser value than the first circumference. Ridge 76 is formed along the inner surface of cover 24 between first portion 72 and second portion 74. Base portion 22 is provided with first rear portion 78 having a circumference and second enlarged front portion 80 having a larger circumference. Shoulder 82 is formed intermediate rear portion 78 and front portion 80.

Projection 84 extends upwards along the length of front portion 80 from first ear 86 to second ear 88, on which are provided pivot pins 66. Front 90 of projection 84 is curved slightly from front to back and mates with ridge 76 formed along the interior of cover 24 with the cover in a closed position. First portion 72 of the cover is sized to matingly fit over and receive enlarged front portion 80 of base portion 22 with the cover closed. Ridge 76 abuts or is at least in close adjacent relationship with circumferential edge 92 of base portion 22, including projection 84. Upraised projection 84 acts, in cooperation with cover 24, as a shield to prevent liquids collected along upper surface 94 from entering the area enclosed by cover 24 and base portion 22 with the cover in a closed position. Further, upper surface 94 may be angled from front to back to help direct liquid collected thereupon away from the front of the enclosure, toward and upon rear portion 78, which may also be sloped from front to rear, and ultimately off the rear of the enclosure and down back wall 46. With screw receiving recesses 44 completely sealed off to the interior of the base portion, no liquids are permitted into the interior of the base portion where the electrical components are housed, thereby preventing damage thereto.

The convergence of cover portions 72 and 74 that forms inner ridge 76 also forms outer ridge 102, which prevents liquids that collect along outer and upper surface 104 of cover 24 from communicating in a rearward direction toward base portion 22. Water is thereby directed in a forward direction to flow over and along sloped upper surface 106 and off the front of cover 24.

Figure 13:
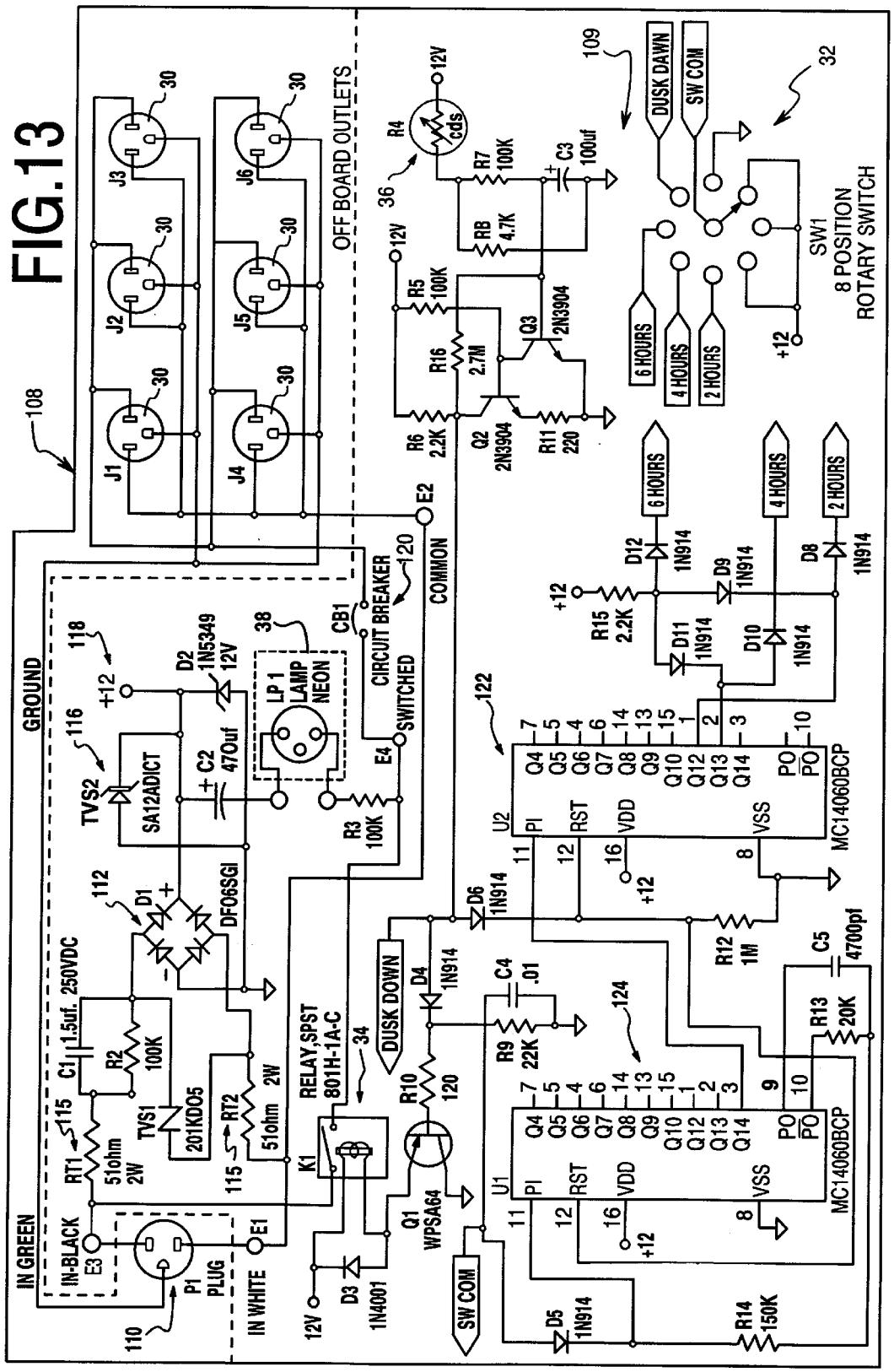
FIG. 13 is a schematic diagram of the electronic timing and switching circuit of one embodiment of the present invention.

FIG. 13 is a schematic diagram illustrating a first embodiment of an electronic control/switching circuit, generally referenced at 108, housed by enclosure 20. Electric cord and plug assembly forming a power supply, shown diagrammatically at 110, is adapted to be connected to a power source, such as by a common residential 120 VAC wall receptacle. The alternating current is connected to the input of bridge rectifier circuit 112, which converts the alternating current source to a 12 volt direct current source at the output of the rectifier, such as seen at node 118. To protect the circuit from extreme conditions, e.g., such as caused by turning off power flood lights, the input of rectifier circuit 112 is coupled to bidirectional transient voltage suppressor 114 and the direct current output is coupled to bidirectional transient voltage suppressor 116. In addition, thermistors 115 are connected to the power supply on the input side of rectifier 112.

Indicator light 38 is connected between the output side of the rectifier and circuit breaker 120 to provide user indication that power is available to receptacles 30 through the switching circuit. Rotary switch 32 provides user selection of a desired operation from a plurality of predetermined selections, such as timed operation in two, four, and six hour periods of time from the onset of nighttime, as sensed by photocell 36. A timing mechanism, such as a crystal, is utilized as a means for effecting the selected time period of operation. Integrated chips 122 and 124 accomplish the timer functions of the circuit illustrated in FIG. 13. A dusk-to-dawn selection is also available for providing power to receptacles 30 from dusk to dawn every day or until the user chooses a new selection. The control circuit, via switch 34, selectively connects receptacles 30 to the power supply.

In the above-described manner, a user may select a desired operation and, unlike many timers which must be reset for each operation, the unit will function each and every night according to that selection until being disconnected from the power source, undergoing a selection change, or tripping of the circuit breaker. The rotary switch provides a user-friendly method of selecting between the operation selections, as compared to the more cumbersome locking pins associated with typical electro-mechanical timers. Continuous "on" and "off" selections are also provided. Although a particular combination of selections is described herein, the present invention fully comprehends any of a wide variety of possible selections and combinations thereof. The electronic components that comprise the above described first embodiment of the invention are provided in Table 1.

TABLE 1

| | |
|---|---|
| CB1 | Circuit Breaker, HWAWON # HW-15MB, 15 A, 125 VAC |
| C1 | 1.5 uF, 250 VDC, Metallized Film Cap PANASONIC # ECQ-E2105KF |
| C2 | 470 uF, 25 V, Aluminum Electrolytic PANASONIC # ECE-A1EU471 |
| C3 | 100 uF, 25 V, Aluminum Electrolytic PANASONIC # ECE-A10Z100 (Low Leak) |

TABLE 1-continued

| | |
|---|---|
| C4 | .01 uF, 50 V, Ceramic Disc Cap +80%, −20% |
| C5 | 4700 pF, 50 wvdc, Polypropylene Cap +/−2%, PANASONIC # ECQ-P1H472GZ |
| D1 | Bridge Rectifier, 600 V, 50 A Surge; 4-Pin Dip, GENERAL INSTRUMENT # DF06SGI |
| D2 | Zener Diode 12 V, 1 W, IN5349 |
| D3 | Rectifier Diode 1N4001 |
| D4, D5, D6, D8, D9, D10, D11, D12 | Signal Diode 1N914 |
| J1, J2, J3, J4, J5, J6 | Outlet Contact Rails, 115 VAC; Bronze |
| K1 | Relay SPST, 12 V Coil, 720 Ohm; 125 VAC, 15 A Contact, 801H-1A-C |
| LP1 | Lamp Neon, Mouser # NE-2E .3 MA, 1/25 W, 65/90 VAC/VDC Breakdown |
| P1 | Plug, 115 VAC |
| Q1 | PNP Power Transistor, MPSA64 |
| Q2, Q3 | NPN Power Transistor, 2N3904 |
| R2, R3, R5, R7 | 100 Kohm Resistor, ¼ W, 5% Carbon Film |
| R4 | Cds Photocell, CDS 8005 |
| R6, R15 | 2.2 Kohm Resistor, ¼ W, 5% Carbon Film |
| R8 | 4.70 Kohm Resistor, ¼ W, 5%, Carbon Film |
| R9 | 22 Kohm Resistor, ¼ W, 5%, Carbon Film |
| R10 | 120 ohm Resistor, ¼ W, 5%, Carbon Film |
| R11 | 220 ohm Resistor, ¼ W, 5%, Carbon Film |
| R12 | 1 Mohm Resistor, ¼ W, 5%, Carbon Film |
| R13 | 20 Kohm Resistor, ¼ W, 5%, Carbon Film |
| R14 | 150 KOhm Resistor, ¼ W, 5%, Carbon Film |
| R16 | 2.7 MOhm Resistor, ¼ W, 5%, Carbon Film |
| U1, U2 | 14 Bit Binary Counter, 16 Pin Dip, MC14060BCP |
| SW 1 | 8 Position Rotary Switch, Common Terminal, RCP16-1-1-8 |
| TVS1 | MOV, 201KD05 |
| TVS2 | 500 W Bidirectional Transient Voltage Suppressor, 12 V Nominal DK # SA12ADICT |
| RT1, RT2 | 51 ohm Resistor, 2 W, 5%, METAL FILM |

Figure 14:
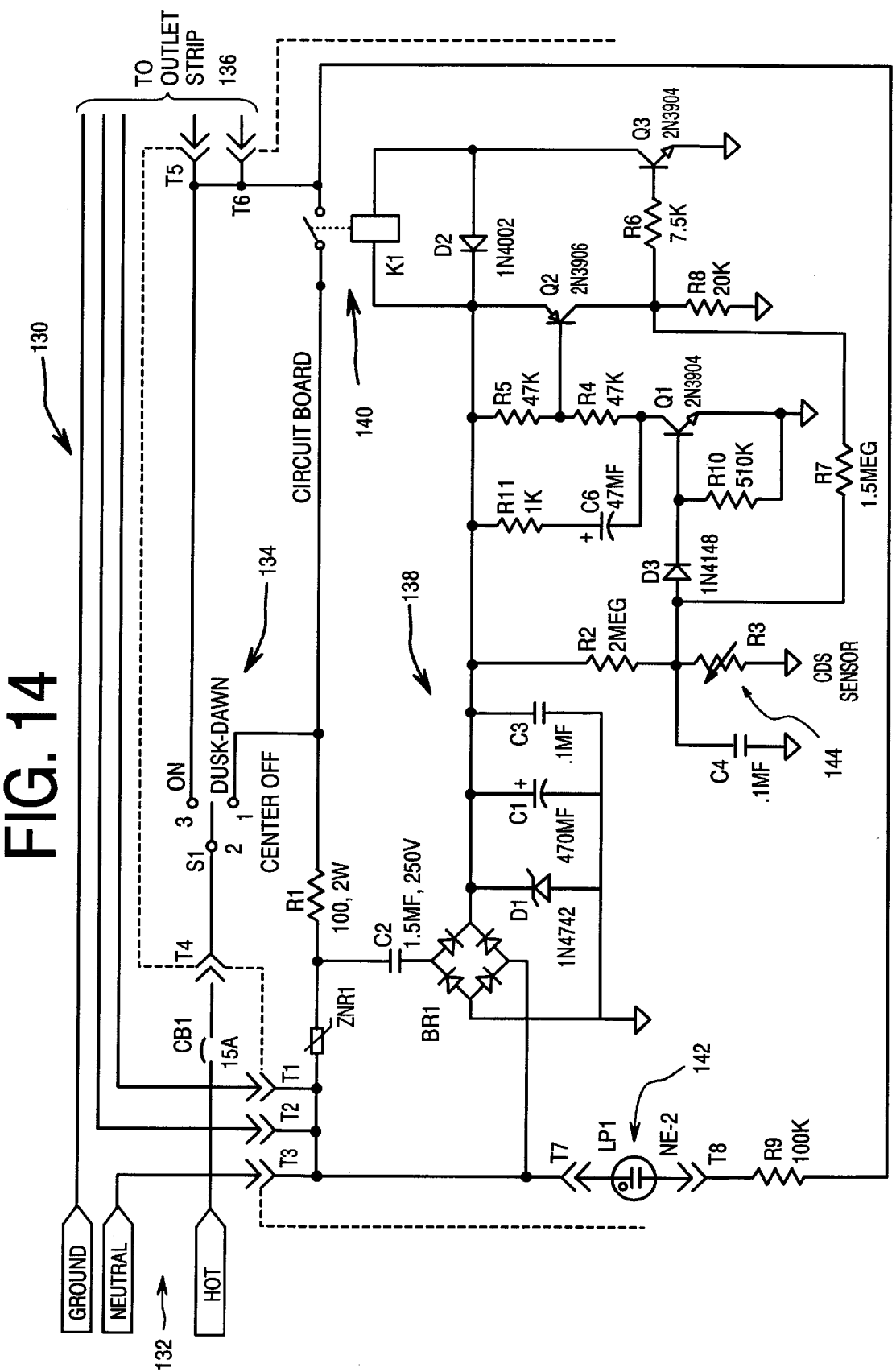

As shown in FIG. 14, a second embodiment electronic control/switching circuit, referenced generally at 130, is connected to a power supply 132, such as an electrical cord adapted to be connected to a common residential 120 VAC wall receptacle. The alternating current power source is connected to the pole of three-position switch 134, which includes a constant "ON" position, a "DUSK-DAWN" position, and a center "OFF" position. When in the "ON" position, the power supply is connected directly to the receptacles of outlet strip 136. When in the center "OFF" position, no power is delivered to the outlet strip. When in the "DUSK-DAWN" position, control circuit 138 operates to place switch 140 in either an open or closed position. With switch 140 in a closed position, power is delivered to the outlet strip and ultimately to the electrically operated devices connected thereto.

Indicator light 142 is connected across the output to the outlet strip to provide user indication that power is available to the receptacles through the switching circuit. Switch 134 provides user selection of a desired operation which commences upon the onset of nighttime, or some threshold level of light, as sensed by photo-sensitive cell 144. Although a particular combination of selections is described herein, the present invention fully comprehends any of a wide variety of possible selections and combinations thereof. The various components are connected to the circuit board at terminals T1–T8. The electronic components that comprise the above described second embodiment of the invention are provided in Table 2.

TABLE 2

| | |
|---|---|
| BR1 | Bridge, Recitifier 600 V, 50 A Surge, 4-Pin Dip; DF06SGI |
| CB1 | Circuit Breaker, 15 A, 125 VAC; HW-15MB; E94774 |
| C1 | 470 uf, 25 V, Electrolytic |
| C2 | 1.5 uf, 250 VDC, Metallized Film Cap |
| C3, C4 | 0.1 uf, 50 V Ceramic Cap, 100 V, .25 Lead Spacing |
| C6 | 47 uf, 25 V, Electrolytic |
| CDS1 | Cds Photocell; VT831V1 |
| D1 | Diode, Zener; 1N4742 |
| D2 | Diode; 1N4002 |
| D3 | Diode; IN4148 |
| K1 | Relay, SPST, 12 V COIL, 15 A, 125 VAC; 801H-1A-C; E88991(S) |
| LP1 | Lamp, Neon, .3 MA, 1/25 W, 65/90 VAC/VDC Breakdown; NE-2E |
| Q2 | Transistor; 2N3906 |
| Q1, Q3 | NPN Power Transistor; 2N3904 |
| R1 | 100 ohm Resistor, 2 W, Metal Film |
| R2 | 2 M ohm Resistor, ¼ W, 5%, Carbon Film |
| R4, R5 | 47 K ohm Resistor, ¼ W, 5%, Carbon Film |
| R6 | 7.5 Kohm Resistor, ¼ W, 5%, Carbon Film |
| R7 | 1.5 Mohm Resistor, ¼ 5%, Carbon Film |
| R8 | 20 Kohm Resistor, ¼ W, 5% Carbon Film |
| R9 | 100 Kohm Resistor, ¼ W, 5%, Carbon Film |
| R10 | 510 Kohm Resistor, ¼ W, 5%, Carbon Film |
| R11 | 1 Kohm Resistor, ¼ W, 5%, Carbon Film |
| S1 | SPDT (ON-OFF-ON) Rocker Switch, 15 A; Panel Mount |
| ZNR1 | Varistor, 200 V; SAS201KD07 |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A combination electrical apparatus and enclosure comprising:

a power supply;

an electrical apparatus connected to said power supply, said electrical apparatus comprising:

at least one receptacle for receiving an electrical plug for connecting the power supply to an electrical device;

an electronic control circuit connected electrically between said at least one receptacle and the power supply;

a photo-sensitive device connected to an input of said control circuit and adapted to generate a signal that generally indicates a threshold level of darkness, said control circuit adapted to electrically connect said receptacle to the power supply based upon said signal; and an enclosure comprising a base including a front face, a rear face, a top, a bottom, and side portions extending between said top and bottom defining an interior space and enclosing said control circuit, said base front face supporting said at least one receptacle and said photosensitive device, said base rear face being adapted to mount said enclosure to a support, and each of said base side portions including a hinge projection;

a cover hingeably mounted to said base and being pivotable between an open position exposing said front face and a closed position covering said front face, receptacle and photoelectric device, said cover including a front face, a top, a bottom and side portions extending between said top and bottom, said cover bottom being adapted to receive at least one cord, said cover and said base in combination forming a cavity for receiving electrical components, said cover top and side portions being configured to at least partially overlap said base top and side portions when in said closed position, whereby the electrical components contained within said cavity are substantially isolated from environmental conditions, each said cover side portion including an opening for receiving said base hinge projection and having a channel adjacent said cover opening to guide and facilitate positioning of said base projections into said cover openings when mounting said cover onto said base, said cover side portions being made of a material that permits deflection of said cover side portions to allow mounting of said cover onto said base, whereby said cover is removable from said base when mounted to a support, said front face of said cover having a substantially transparent area aligned with said photosensitive device to allow light to actuate said photosensitive device when said cover is closed.

2. The combination of claim 1 further comprising a control switch electrically connected to said control circuit for selectively choosing a mode of operation from one of the group consisting of: a dawn-to-dusk-to-dawn operation; continuous on operation; and continuous off operation.

3. The combination of claim 2 wherein said cover includes a transparent window aligned with said control switch.

4. The combination of claim 2, wherein said electrical control circuit includes an adjustable electronic timer controlling the electrical connection based upon said signal between the power supply and said at least one receptacle, and wherein said group of modes of operation further consists of a preselected timed operation.

5. The combination of claim 4, wherein said control circuit is adapted to provide said preselected timed operation, said preselected timed operation beginning upon said control circuit receiving said signal from said photosensitive device and terminating after a predetermined period of time.

6. The combination of claim 1, wherein said control circuit is solid state.

7. The combination of claim 1, wherein said electrical apparatus further comprises a rectifier having an input connected to the power supply and an output for providing a control power supply to said control circuit.

8. The combination of claim 1, wherein said electrical apparatus further comprises a light adapted to indicate the presence or absence of power to said at least one receptacle.

9. The combination of claim 1, wherein said electrical apparatus further comprises a circuit breaker electrically disposed intermediate the power supply and said at least one receptacle.

10. The enclosure of claim 1 further comprising a latch mechanism which comprises a latch member and a latch retainer, said latch member having a cam surface adapted to engage said latch retainer, whereby during the act of latching said cover to the closed position, said latch member deflects when initially engaging the front portion of said latch retainer and engages with a rear portion of said latch retainer when in the closed position.

11. The enclosure of claim 1 further comprising a lock receptacle adapted to receive a lock, whereby said cover may be locked in the closed position.

12. The enclosure of claim 1, wherein said cover includes a transparent area permitting visual inspection of the front face of said base.

13. The enclosure of claim 1, wherein said base bottom and top and said cover are matingly stepped so as to provide a circumferential dam to prevent infiltration of liquids.

14. The enclosure of claim 1, wherein said cover comprises a bottom that includes at least one projection which forms an opening for receiving an electrical cord, whereby the electrical cord may extend from said cavity to outside said enclosure with said cover in the closed position.

15. The combination of claim 1 wherein at least one notch is formed between the base bottom and a lower edge of said cover to permit an electrical cord to enter a cavity defined between said cover and base front face.

16. The combination of claim 15 and including a projection on said cover extending over said at least one notch.

17. The combination of claim 1 wherein said electrical control circuit includes an adjustable electronic timer controlling the electrical connection between the power supply and said at least one receptacle.

18. The combination of claim 17, wherein said control circuit is adapted to provide a plurality of preselected timed operations, each of said plurality of preselected timed operations representing some multiple of one hour.

19. The combination of claim 1, wherein each of said side portions of said cover have a rear edge opposite said front face, and an inner surface facing said base, wherein said channel is formed in said inner surface for guiding said base projections into said cover openings.

20. The combination of claim 19, wherein said channels extends between said rear edge of a respective side portion and said cover openings.

21. The combination of claim 20, wherein each of said channels include side edges extending tangentially from a respective cover opening.

22. The combination of claim 21, wherein said side edges of said channels converge from said rear edges of said side portions to said cover openings.

23. An outdoor enclosure for supporting electrical components and for protecting such electrical components from environmental conditions, said enclosure comprising:

a base having front and rear faces, a top, a bottom, and side portions which define an interior space adapted to receive electrical components, said base front face supporting at least one receptacle, said base rear face adapted to mount said enclosure to a support, each said base side including a hinge projection; and a cover having a front face, a top, a bottom and side portions, said cover bottom being adapted to receive at least one cord, said cover and said base being adapted in combination to form a cavity for receiving electrical components, said cover top and side portions being configured to at least partially overlap said base top and side portions when attached thereto, whereby the electrical components contained within said cavity are substantially isolated from environmental conditions;

each side cover side portion having an opening for receiving said base hinge projection and a channel adjacent said cover opening to guide and facilitate positioning of said base projections into said cover openings when mounting said cover onto said base, said cover sides being made of a material that permits deflection of said cover sides to allow mounting of said cover onto said base, whereby said cover may be removed from said base when mounted to a support;

each combination of said cover opening and said base hinge projection adapted to form a hinge, whereby said cover is pivotally connected to said base to pivot between open and closed positions to enclose completely said front face of said base.

24. The enclosure of claim 23 further comprising a latch mechanism comprising a latch member and a latch retainer, said latch member having a cam surface which engages said latch retainer, whereby during the act of latching said cover to a closed position, said latch member deflects when initially engaging the front portion of said latch retainer and locks into position engaged with a rear portion of said latch retainer.

25. The enclosure of claim 23 further comprising a lock receptacle adapted to receive a lock, whereby said cover may be locked in a closed position.

26. The enclosure of claim 23, wherein said cover includes a transparent area permitting visual inspection of said cavity.

27. The enclosure of claim 23, wherein said base bottom and top and said cover bottom and top are matingly stepped so as to provide a circumferential dam to prevent infiltration of liquids.

28. The enclosure of claim 23, wherein said cover bottom includes at least one projection which forms an opening for receiving electrical cords, whereby the electrical cords may extend from said cavity to outside said enclosure with said cover in the closed position.

29. The enclosure of claim 23, wherein said cover side portions have a rear edge opposite said front face and an inner surface facing said base, wherein said channels are formed in an inner surface of said side portions and extend from said rear edge to a respective over opening.

30. The enclosure of claim 29, wherein said channels include side edges converging from said rear edge to said cover openings.

* * * * *